Dec. 22, 1964 W. T. WINTRINGHAM 3,162,819
POLYPHASE DEMODULATION
Filed June 27, 1960 3 Sheets-Sheet 1

INVENTOR
BY W. T. WINTRINGHAM
Harry C. Hart
ATTORNEY

Dec. 22, 1964 W. T. WINTRINGHAM 3,162,819

POLYPHASE DEMODULATION

Filed June 27, 1960 3 Sheets-Sheet 2

INVENTOR
W. T. WINTRINGHAM
BY Harry C. Hart
ATTORNEY

Dec. 22, 1964 W. T. WINTRINGHAM 3,162,819

POLYPHASE DEMODULATION

Filed June 27, 1960

3 Sheets-Sheet 3

INVENTOR
W. T. WINTRINGHAM
BY Harry C. Hart
ATTORNEY

3,162,819
POLYPHASE DEMODULATION

William T. Wintringham, Chatham, N.J., assignor to Bell Telephone Laboratories, Incorporated, New York, N.Y., a corporation of New York Filed June 27, 1960, Ser. No. 38,791
16 Claims. (Cl. 329—145)

This invention relates to the demodulation of a modulated carrier signal to recover information signals. It has for its principal object the elimination of undesired output signals that normally attend such demodulation.

Conventional demodulators employ circuit elements with nonlinear transfer characteristics. As a result the demodulated output signals are rich in harmonics, particularly those of the carrier. Accordingly, a primary object of the invention is to suppress selected ones of the carrier harmonics.

In further consequence of the demodulator nonlinarities the carrier harmonics and the information signals interact to produce unwanted components giving rise to intermodulation distortion. A further object of the invention is to reduce the extent of such distortion.

Where it is desirable to limit the upper bound of the transmission bandwidth of signals dispatched from one locality to another, the carrier signal employed is often of a frequency that is not far removed from that of the highest frequency component of the information signals. In this case the intermodulation products originating with demodulator nonlinearities may be present within the frequency band of the information signals and as such are not separable by filtering if the entirety of the transmitted information is to be available. Accordingly, a related object of the invention is to prevent intermodulation distortion within the frequency band of the information signals.

With the demodulation of an amplitude modulated signal, the principal intermodulation distortion is confined to the relatively restricted spectrum of information signals centered on the frequency of each carrier harmonic. On the other hand, with the demodulation of a frequency modulated signal or any other kind of angle modulated signal, the modulation spectral band centered about each carrier harmonic frequency is far more extensive than that of the information signals from which the band is derived, and those of the intermodulation components that lie within the frequency band of the original signal are more extensive and are of greater intensity than in the case of amplitude modulation. Accordingly, a specific object of the invention is to eliminate intermodulation distortion within the frequency band of information signals recovered from an angle modulated carrier signal.

The invention is characterized by the transformation of a modulated single-phase carrier signal into a modulated polyphase one having as many phases as the order of the lowest tolerable harmonic of the carrier. The phase components of the polyphase signal are uniformly distributed over $2\pi$ radians. They are applied to individual demodulators whose outputs collectively contain the demodulated information signals and a group of demodulated polyphase harmonics. These demodulation products are linearly combined according to the invention in a summation network to (1) reunite the portions of the message signals which had been partitioned among the various phases, and (2) prevent certain harmonic components that normally attend demodulation from having any output amplitude whatsoever. The invention stems, in part, from the realization that all members of the harmonic group, except those of the order KN, where K is an integer and N is the order of the polyphase system, have component phase distributions that add vectorially to zero. Hence, the polyphase approach permits nullification, in the output of the system, of all undesired components for which this zero-sum relation holds.

According to a feature of the invention the phase displacements imparted to the component signals derived from a modulated carrier should be sufficiently uniform over a broad frequency band that the relative phase relations between the carrier signal and the information signals carried thereby will not be altered.

Nevertheless, even with phase displacements that are nonuniform over a frequency band of interest, the invention may be applied to eliminate carrier harmonics. In that event phase distortion in the reconstituted information signals at the output of the system is corrected by convenional compensation networks. Such is the case, for example, when the phase displacement effect prescribed by the invention is achieved with a tapped delay line.

A further modification of general applicability is desirable if the phase displacements require appreciable time intervals. Then equalizers are employed to assure time matching of the component phase signals. Further, because of variations in system elements or because of the derivation of the component phase signals in an auxiliary distributor instead of directly from the modulated carrier signal, the equalizers may also advantageously perform the additional function of assuring that the phase signals are of equal amplitude.

The accomplishment of the above objects is demonstrated in several illustrative embodiments of the invention taken in conjunction with the drawings, in which.

Figure 1:
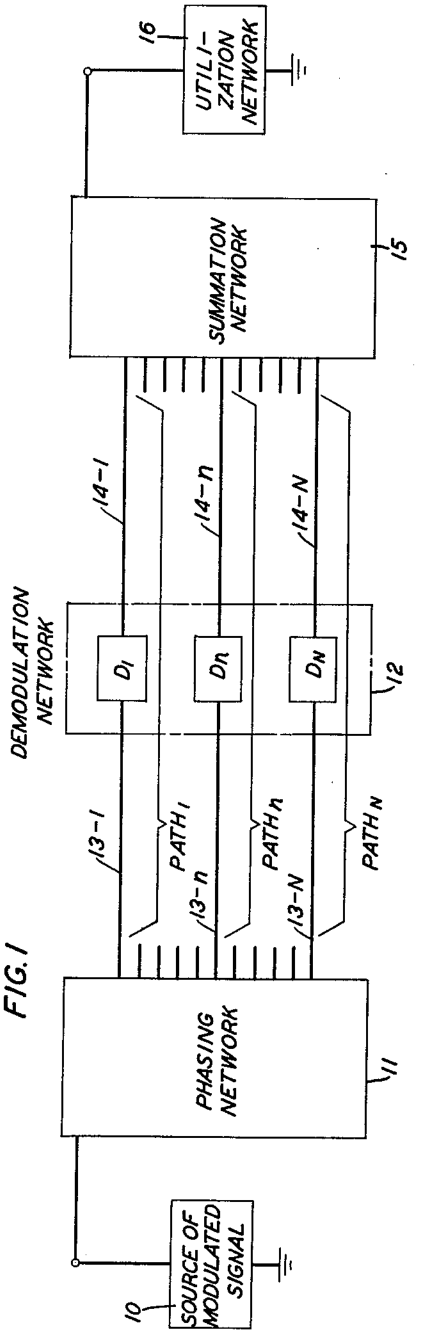
FIG. 1 is a block diagram of a generalized polyphase demodulation system.

Turn now to FIG. 1, presenting a generalized polyphase demodulation system for the recovery of message or information signals from a modulated carrier signal. A single-phase source 10 providing either a frequency modulated signal or an amplitude modulated signal is connected to a phasing network 11 which may assume any one of a variety of configurations to be considered shortly. The phasing network operates to derive a polyphase carrier signal whose components, N in number and similarly modulated, have relative phase shifts of $2\pi/N$ radians and appear on individual paths 1 through N, including a typical intermediate path $n$. The several components are next applied individually to demodulators $D_1$ through $D_N$, constituting a demodulation network 12 with a typical member $D_n$. Each of these demodulators $D_1$ through $D_N$ acts individually in conventional fashion to recover the message signals carried by the individual phase component supplied to it. Thus, the output conductors 14–1 through 14–N of the demodulators $D_1$ through $D_N$ in the paths 1 through N carry identical message signals. These are added together in a summation network 15 to provide, finally, a resultant of the signals which is supplied to a utilization network 16.

The output of each of the demodulators $D_1$ through $D_N$, taken by itself, includes, in addition to the desired message wave, certain undesired harmonics, the majority of which appear on the output conductors 14–1 through 14–N of the several demodulators $D_1$ through $D_N$ with phase relations among their components such that their vector sum is zero. Hence, after addition by the summation network 15 of all the component signals appearing on all the output conductors 14–1 through 14–N of all the demodulators $D_1$ through $D_N$, the desired message wave or envelope is substantially unaccompanied by undesired components, as will appear from the following analysis.

Assume that the polyphase carrier signal on the output conductors 13–1 through 13–N of the phasing network in FIG. 1 has three phases. This case is of the lowest order illustrating the phase shift technique of the invention. The three phases, represented by three vectors $V_1$, $V_2$ and $V_3$ in FIG, 2A, are respectively conveyed on path 1, path $n$ which becomes path 2, and path N which becomes path 3. The first phase component $V_1$ has an angular displacement $\varphi_1$, which may be zero, with respect to the incoming single-phase carrier signal from which it is derived. The second phase component $V_2$ has an angular displacement $\varphi_2$ of $2\pi/3$ radians relative to the first phase component $V_1$. Finally, the third phase component $V_3$ has an angular displacement $\varphi_3$ of $4\pi/3$ radians relative to the first phase component $V_1$. In this way the distinctive phase components of the evolved polyphase carrier on the separate paths 1, $n=2$ and $N=3$ are uniformly distributed over $2\pi$ radians.

Figure 2B:
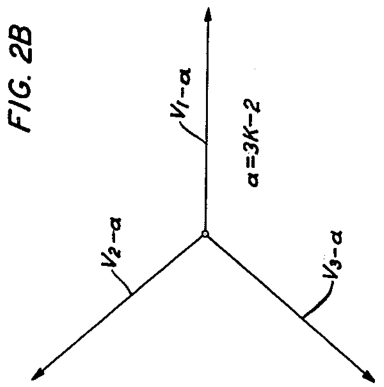
FIGS. 2A through 2D are vector diagrams illustrative of polyphase demodulation.
Figure 2D:
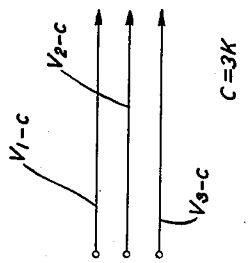
Figure 2A:
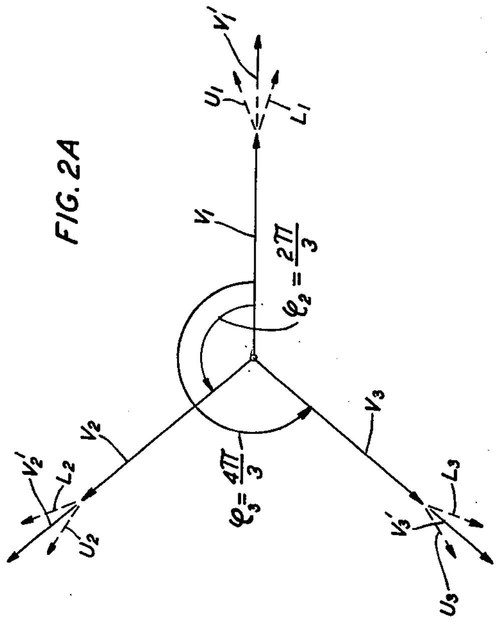

Modulation of the polyphase carrier by a single frequency modulating signal is illustrated in FIG. 2A for the case of amplitude modulation. The upper and lower sidebands $U_1$ and $L_1$ through $U_3$ and $L_3$ of the modulating signal straddle each of the carrier phase components $V_1$ through $V_3$. It is evident that if the sideband and carrier components are shifted in phase to the same extent, no residual phase difference exists among the various sidebands U and L recovered by demodulation because in each instance the phase shift of the carrier is subtracted from that of the sideband. This is equivalent to the requirement that the resultant vectors $V_1'$ through $V_3'$ created by the formation of the sidebands $U_1$ and $L_1$ through $U_3$ and $L_3$ must be linear extensions of the vectors $V_1$ through $V_3$ representing the carrier. Evidently, with sidebands having a wide frequency spread the phasing network 11 of FIG. 1 should itself be a wide band device. With narrow band information signals the requirements on the phasing network 11 become less stringent, and in any case a compensating network may be introduced into the demodulation system to correct for any envelope distortion resulting from the residual phase shift of the demodulated information signals.

For modulation of the polyphase carrier in the case of angle modulation, a vector diagram analogous to that of FIG. 2A may be constructed. However, the resultant vectors of the sidebands would be at right angles to their respective carrier phase components.

By its inherent nature the processing of the component phase signals $V_1$ through $V_3$ in the respective demodulators $D_1$ through $D_3$ engenders harmonic components on the various paths 1 through $N=3$. These harmonic components of like order and on successive paths may be considered as one member of a polyphase harmonic group.

Figure 2C:
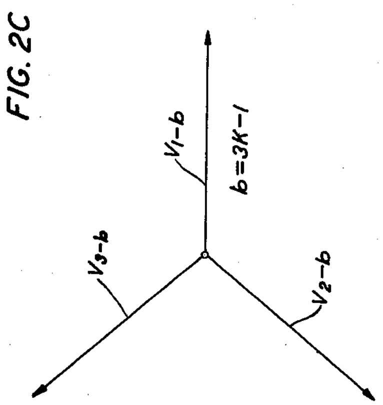

For a three-phase system the vector diagrams for such a group of harmonics fall into the three categories shown in FIGS. 2B through 2D, simplified by the omission of modulation components.

The first category of vector diagram in FIG. 2B applies to harmonics of the order of $a=3K-2$, where K is an integer. When $K=1$ the vector diagram becomes that of the first harmonic, which is a replica of the polyphase carrier initially derived by the phasing network. The components $V_{1-a}=V_{1-1}$, $V_{2-a}=V_{2-1}$ and $V_{3-a}=V_{3-1}$ appear beyond the demodulation network 12 in FIG. 1 on respective paths 1, $n=2$ and $N=3$.

FIG. 2C depicts the second category of harmonic vector diagram in a three-phase system. It is relevant to harmonic members of order $b=3K-1$ having their components oriented like those of FIG. 2B, with the second and third components of the latter interchanged. This interchange arises because the resultant phase displacement of the harmonic components $V_{2-b}$ on the second path $n=2$ of FIG. 1 is $$(3K-1)\frac{2\pi}{3}$$

radians, which is reducible to $$-\frac{2\pi}{3}$$

the equivalent of $$\frac{4\pi}{3}$$

regardless of the integral value assigned to K. In the same way the phase displacement of the harmonic components $V_{3-b}$ on the third path $N=3$ of FIG. 1 is $$(3K-1)\frac{4\pi}{3}$$

radians, which is equivalent to $$\frac{2\pi}{3}$$

The third and final category of harmonic vector diagram in a three-phase system is set forth in FIG. 2D and is applicable to harmonic of order $c=3K$. It is seen that all three components $V_{1-c}$, $V_{2-c}$ and $V_{3-c}$ must be in phase coincidence since both $$\frac{2\pi}{3}(3K) \text{ and } \frac{4\pi}{3}(3K)$$

are reducible to multiples of $2\pi$ radians.

That the harmonics of the first and second categories are suppressed by the summation network 15 of FIG. 1 is evident from a vector addition of components in FIGS. 2B and 2C. In both instances a first vector addition of the second and third components may be represented by a first resultant that is equal in magnitude to the first component, but opposite in phase. Through a second vector addition, the first resultant and the first component cancel one another. While the coincident polyphase harmonic components in FIG. 2D of the third category, i.e., those of order $c=3K$, do have an output effect, the harmonic order of this effect is controlled according to the number of phases provided in the demodulation system.

Thus, a three-phase system allows suppression of all modulation products except those associated with the third harmonic of the carrier and all integral multiples thereof. In general, an N-phase system allows suppression of all modulation products except those associated with the Nth harmonic of the carrier and all integral multiples thereof.

Figure 3B:
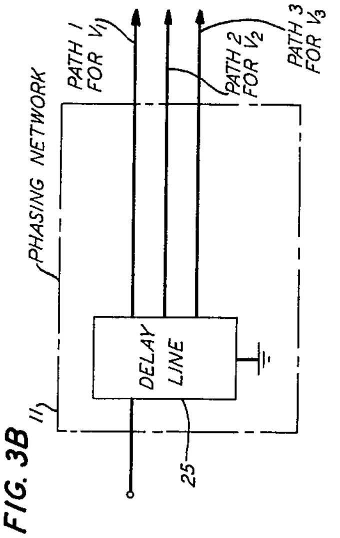
FIGS. 3A through 3C are block diagrams of phasing networks adaptable to the system of FIG. 2.
Figure 3A:
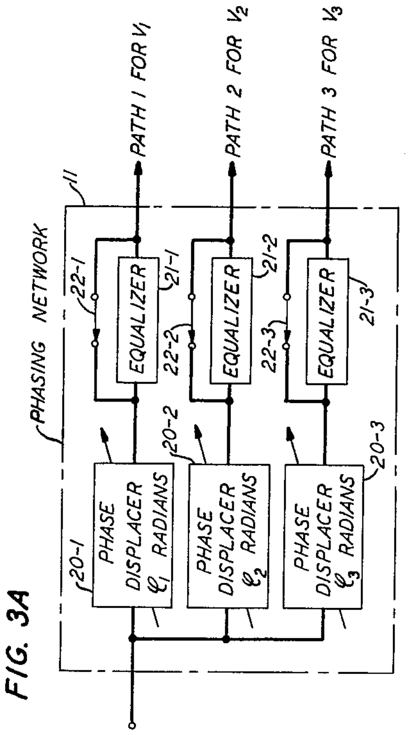

A first kind of phasing network 11 for the demodulation system of FIG. 1 is depicted in FIG. 3A. The paths 1 through 3 provided for the individual phase components $V_1$ through $V_3$ include respective and adjustable phase displacers 20–1 through 20–3. The circuit components of the displacers 20–1 through 20–3 are selected according to network synthesis techniques to establish the requisite relative phase displacement between the component signals on the successive paths of $2\pi/N$ radians, where N, which is the order of the system, is three for the network illustrated. Of course, the first component $V_1$ may be in phase coincidence with the carrier signal, whereupon the first phase displacer 20–1 is not needed. Depending upon the construction of the phase displacers 20–1 through 20–3, undesirable time delays and nonuniformities of amplitude may exist among the various phase components $V_1$ through $V_3$. Where necessary, equalizer networks 21–1 through 21–3 are inserted into the paths 1 through 3 by opening respective bypass switches 22–1 through 22–3. In the idealized three-phase system with thte vector diagram of FIG. 1A, equalization is not needed.

Instead of individual phase displacers, a tapped delay line 25 with the configuration of FIG. 3B may be used to provide the requisite polyphase carrier signal. The equivalent phase shift produced by the delay line 25 is calculated by taking the product of the signal frequency and the time of delay. Since the frequencies of the carrier and the sideband signals differ for a fixed time delay, the demodulated information signals obtained from the various paths are not in phase coincidence. The resulting phase distortion of the information signals may be corrected by incorporating a compensation network into the utilization network 16 of FIG. 1.

Figure 4B:
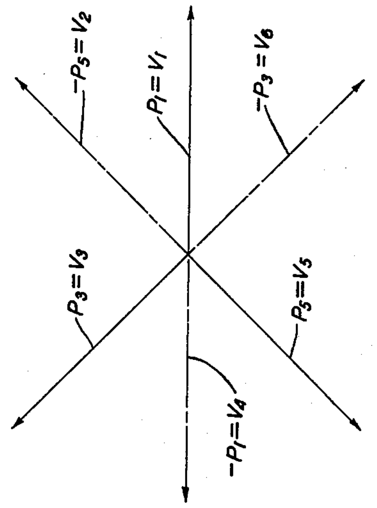
FIGS. 4A and 4B are vector diagrams illustrative of techniques for creating a polyphase carrier signal.
Figure 4A:
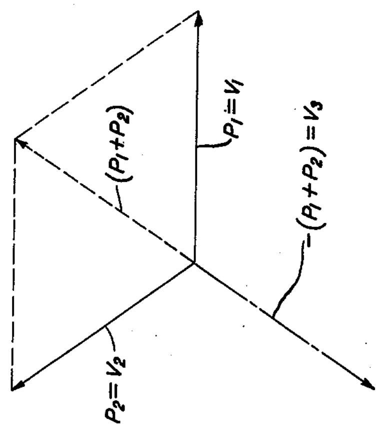

In deriving the polyphase carrier of the invention it is not necessary to employ a separate phase displacer, such as any displacer 20 of FIG. 3A, for each phase component. Where but a limited number of phase displaced components are available, the others may be derived therefrom by dividing the phasing network 11 of FIG. 1 into the two distributor sections 30–1 and 30–2 of FIG. 3C. A first distributor 30–1 may be used to form a primary set of phase shifted components. When there are but two members in the set, the first one may be taken as a reference and a second one may be given a relative phase displacement of $K2\pi/N$ radians. In the three-phase system of FIG. 3C phase displacers 20–1 and 20–2 within the first distributor 30–1 are used to establish a relative phase displacement between first and second components $P_1$ and $P_2$ of $2\pi/3$ radians, as indicated in the accompanying vector diagram of FIG. 4A. These components $P_1$ and $P_2$ appear at respective output points 31–1 and 31–2 of the distributor 30–1 and thereafter provide two members $V_1$ and $V_2$ of a secondary set appearing at respective output points 32–1 and 32–2 of the second distributor 30–2. The first and second phase components $P_1$ and $P_2$ are combined in an adder 33 whose resultant $(P_1+P_2)$ furnishes the third component $V_3$ of the secondary set at a third output point 32–3 after being given a phase reversal in an inverter 34. As with the phasing network 11 of FIG. 3A, equalizers 21–1 through 21–3 are available.

While the equalizers 21–1 through 21–3 are not needed in an idealized three-phase system, in a five-phase system, for example, a linear combination of the first and second phase components will provide, after a phase reversal, another phase component which will prove to be the fourth. Thereafter, the third and fifth phase components are obtainable by linear combinations of the second and fourth and the first and fourth components, respectively. The amplitudes of these derived components may be greater than that of either of their constituents. Consequently, equalizers may be needed in the third, fourth and fifth paths emanating from a second distributor in a five-phase system. When the incoming carrier signal is frequency modulated, the equalizer may take the form of an amplitude limiter. If the incoming carrier signal is amplitude modulated, the equalizer may take the form of an attenuator.

In general, with either odd or even phase systems a primary set of components having but two constituents may be used to derive a secondary set of polyphase components. However, with high order even-phase systems it is often simpler to provide $N/2$ components in the primary set which are augmented by these components, as phase reversed, in forming the secondary set. This is demonstrated, for a six-phase system, by the phasor diagram of FIG. 4B where the first, third and fifth components $P_1=V_1$, $P_3=V_3$ and $P_5=V_5$ have been reversed to provide the fourth $-P_1=V_4$, the sixth $-P_3=V_6$ and the second $-P_5=V_2$. Of course, the components of the primary set could have just as easily been the first $P_1$, second $P_2$ and third $P_3$. To simplify high order odd-phase systems, $N+1/2$ components may constitute a primary set, and each auxiliary component of the secondary set may be obtained by the linear combination of immediately adjoining components after the fashion of FIG. 4A.

Figure 5A:
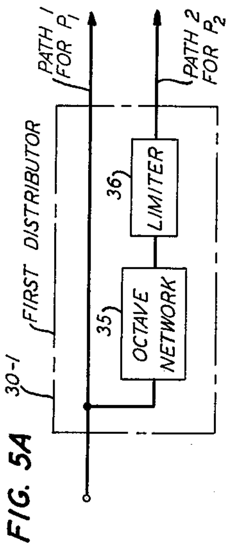
FIGS. 5A and 5B are block diagrams of distributors adaptable to the circuit of FIG. 3C.
Figure 3C:
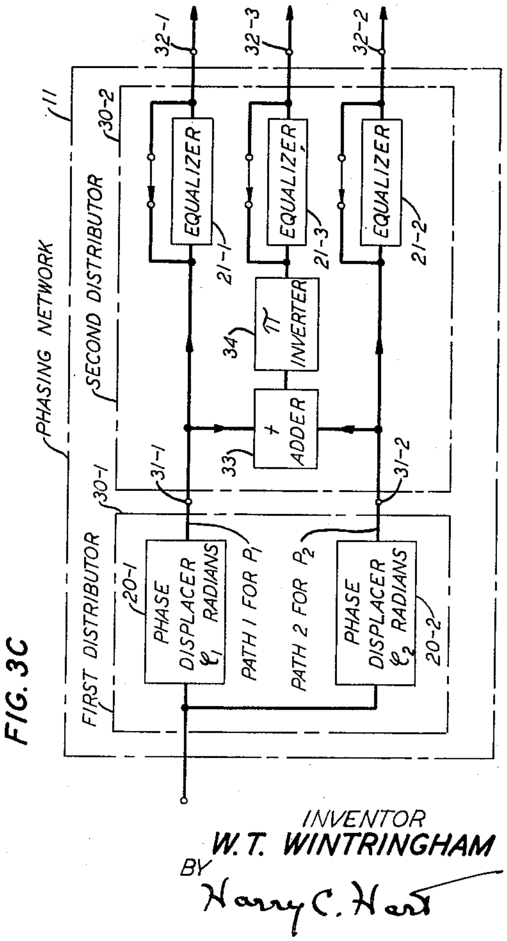

A variety of special networks are available for employment as phase displacers 20–1 through 20–3 in FIG. 3A and as phase displacers 20–1 and 20–2 in the first distributor 30–1 of FIG. 3C. When the incoming signal is frequency modulated, the first distributor 30–1 of FIG. 3C may, as shown in FIG. 5A, includes an "octave network" 35, namely, a network that establishes a uniform phase displacement over a wide band of frequencies dependent upon the attenuation of the network in decibels per octave according to the relation, $$\varphi=\frac{\pi A}{12}$$

where $\varphi$ is phase displacement in radians and A is attenuation in decibels per octave. From the earlier relation $$\varphi=\frac{2\pi}{N}$$

it is seen that the product NA is a constant 24. The octave network 35 is followed by a limiter 36 for the restoration of amplitude uniformity.

Figure 5B:
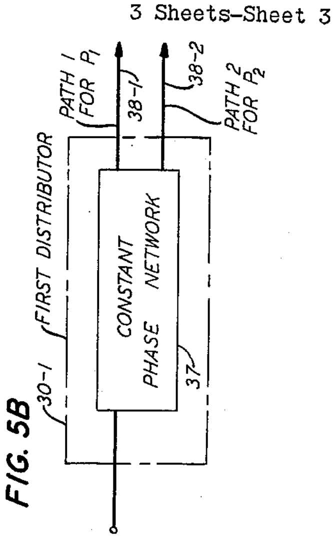

Another suitable device for use as a first distributor 30–1 is the constant phase network 37 of FIG. 5*b*. This network 37 is described by S. Darlington in the Bell System Technical Journal, vol. 29, pages 94–104, dated June 1950, under the title "Realization of a Constant Phase Difference." It allows the establishment of an arbitrary and frequency-independent phase displacement between component signals appearing on two output leads 38–1 and 38–2.

Regarding the individual demodulators $D_1$ through $D_N$ of FIG. 1, for amplitude demodulation representative types are of the power law, homodyne and sampling varieties. When the incoming signal is frequency modulated, the demodulators $D_1$ through $D_N$ may consist of cycle counters or differentiators followed by any of the conventional amplitude demodulators discussed above. Differentiation typically is by slope or phase shift detection. With certain kinds of demodulators, the carrier harmonics are inherently limited, and the number of paths required in a polyphase system is governed accordingly.

Still further varieties of individual demodulators, phasing networks, distribution schemes, and compensation devices will occur to those skilled in the art.

What is claimed is:

1. Apparatus for demodulating a modulated carrier signal and for suppressing undesired harmonics thereof which comprises means for developing from the modulated signal, a number N greater than 2 of replicas thereof whose relative phases are shifted by successive amounts $2\pi/N$ radians, means for individually demodulating each phase shifted replica, and means for combining the demodulated replicas, thereby to form an output signal wherein all harmonics of the carrier signal are suppressed, except those of which the orders are integral multiples of the number N of said replicas.

2. Apparatus for recovering information signals from a modulated carrier signal which comprises an input point to which the modulated carrier signal is applied, phasing means connected to said input point for forming a substantially concurrent set of carrier signals carrying substantially identical information signals and having relative phase displacements uniformly distributed over $2\pi$ radians and appearing on respective ones of a plurality of paths greater than two, means in each of said paths for demodulating the phase-displaced carrier signal appearing thereon to recover said information signals, and means for linearly combining the recovered information signals, supplemented only by those harmonics of said carrier signal whose orders are integral multiples of the number of said paths.

3. Apparatus for recovering information signals from a modulated carrier signal which comprises an input point to which the modulated carrier signal is applied, means connected to said input point for forming, from said modulated carrier signal, an asymmetric polyphase carrier signal composed of a primary set of signals, means for combining the signals of said primary set to form a secondary set of signals constituting a symmetric polyphase carrier signal, said secondary signals carrying substantially identical information signals and appearing on respective ones of a plurality of paths greater than two with relative phase displacements uniformly distributed over $2\pi$ radians, means in each of said paths for demodulating the phase-displaced secondary signal appearing thereon, and means for linearly combining the demodulated secondary signals to provide desired information signals, supplemented only by those carrier signal harmonics whose orders are integral multiples of the number of said paths.

4. Apparatus for processing a carrier signal that has been modulated by an information signal which comprises means for developing from the modulated carrier signal a polyphase carrier signal whose phase-shifted constituent signals appear on respective ones of a plurality of paths greater than two, means in each of said paths for demodulating the phase-shifted constituent signal appearing thereon, and means for combining the demodulated constituent signals to recover the information signal.

5. Apparatus as defined in claim 4 wherein said developing means comprises a tapped delay line with individual taps for at least two of said paths.

6. Apparatus for recovering information signals from a modulated carrier signal which comprise an input point to which the modulated carrier signal is applied, a plurality of paths greater than two, first distributor means connected to said input point for forming, from said modulated carrier signal, a primary set of at least two components having relative phase displacements integrally compatible with $2\pi$ radians divided by the number of said paths, second distributor means for combining said components of said primary set to form a secondary set of signals constituting a symmetric polyphase carrier signal whose members have relative phase displacements uniformly distributed over $2\pi$ radians and appear on respective ones of said paths, means in each of said paths for demodulating the phase-displaced carrier signal appearing thereon, and means for linearly combining the demodulated carrier signals to provide desired information signals, supplemented only by those carrier signal harmonics whose orders are integral multiples of the number of said paths.

7. Apparatus as defined in claim 3 wherein said first distributor means comprises a constant phase network having but two output paths.

8. Apparatus for recovering information signals from a frequency modulated carrier signal as defined in claim 7 wherein said phasing means includes an octave network in at least one of said paths providing relative attenuation between it and another path of $24/N$ decibels per octave, where N is the number of said paths, and limiters in said paths to equalize the amplitudes of the attenuated signals conveyed thereon.

9. Apparatus as defined in claim 6 wherein said first distributor means comprises a number of paths $N/2$ for transporting a first set of signals, where N is the order of an even-phase, polyphase system, and said second distributor means comprises a number of paths N for transporting a second set of signals derived directly from said first set of signals and from said first set of signals as phase inverted.

10. Apparatus as defined in claim 6 wherein said first distributor means comprises a number of paths $N+1/2$ for transporting a first set of signals, where N is the order of an odd-phase, polyphase system, and said second distributor means comprises a number of paths N for transporting a second set of signals derived directly from said first set of signals and from linear combinations thereof.

11. Apparatus for recovering information signals from a modulated carrier signal which comprises an input point to which the modulated carrier signal is applied, phasing means connected to said input point for forming a set of carrier signals carrying substantially identical information signals and having relative phase displacements which are uniformly distributed over $2\pi$ radians and maintained independent of frequency over the full frequency spectrum of said modulated carrier signal to prevent phase distortion of said information signals, the members of said set appearing on respective ones of a plurality of paths greater than two, means in each of said paths for demodulating the phase-displaced carrier signal appearing thereon, and means for linearly combining the demodulated carrier signals to provide desired information signals, supplemented only by those carrier signal harmonics whose orders are integral multiples of the number of said paths.

12. Apparatus for recovering information signals from a modulated carrier signal which comprises an input point to which the modulated carrier signal is applied, phasing means connected to said input point for forming a set of carrier signals carrying substantially identical information signals and appearing on respective ones of a plurality of paths greater than two with relative phase displacements uniformly distributed over $2\pi$ radians, means for equalizing the amplitudes and the times of occurrence of the phase-displaced carrier signals, means in each of said paths for demodulating the phase-displaced carrier signal appearing thereon, and means for linearly combining the demodulated carrier signals to provide desired information signals, supplemented only by those carrier signal harmonics whose orders are integral multiples of the number of said paths.

13. Apparatus for demodulating a carrier signal which comprises means for deriving from the carrier signal at least two simultaneously occurring channel signals, means for deriving from said channel signals at least three phase signals which are shifted in phase relative to each other, means for individually demodulating said phase signals, and means for combining the demodulated phase signals, thereby to form a demodulated output signal.

14. Apparatus for demodulating a carrier signal and suppressing its undesired harmonics which comprises means for concurrently applying the modulated signals to at least two channels, phasing means connected to said channels for forming a set of carrier signals having relative phase displacements uniformly distributed over $2\pi$ radians and appearing on respective ones of a plurality of paths greater than two, means in each of said paths for demodulating the phase-displaced carrier signal appearing thereon, and means for linearly combining the demodulated carrier signals to provide desired information signals, supplemented only by those harmonics of said carrier signal whose orders are integral multiples of the number of said paths.

15. Apparatus for processing a modulated single-phase carrier signal which comprises means for converting the single-phase carrier signal into a polyphase carrier signal having a plurality of phase components greater than two and also having the same carrier frequency as that of said single-phase carrier signal, means for individually demodulating said phase components, and means for combining the demodulated phase components to form an output signal.

16. Apparatus for demodulating a modulated carrier signal and suppressing its undesired harmonics which comprises means for distributing, at each instant of time, the energy of the modulated carrier signal among a number N greater than two of paths so that the relative phases of the signals on the several paths are shifted by successive amounts $2\pi/N$ radians, means for individually demodulating each phase-shifted path signal, and means for combining the demodulated path signals, thereby to form an output signal wherein all harmonics of the carrier signal are suppressed, except those of which the orders are integral multiples of the number N of said paths.

References Cited in the file of this patent

UNITED STATES PATENTS

| | | |
|---|---|---|
| 2,151,091 | Dudley | Mar. 21, 1939 |
| 2,870,247 | Cherry | Jan. 20, 1959 |
| 2,949,505 | Kretzmer | Aug. 16, 1960 |
| 3,042,864 | Godbey | July 3, 1962 |